May 14, 1929.   W. P. WHITE   1,712,537
SPEED INDICATING DEVICE FOR GOLF CLUBS
Original Filed Dec. 1, 1924
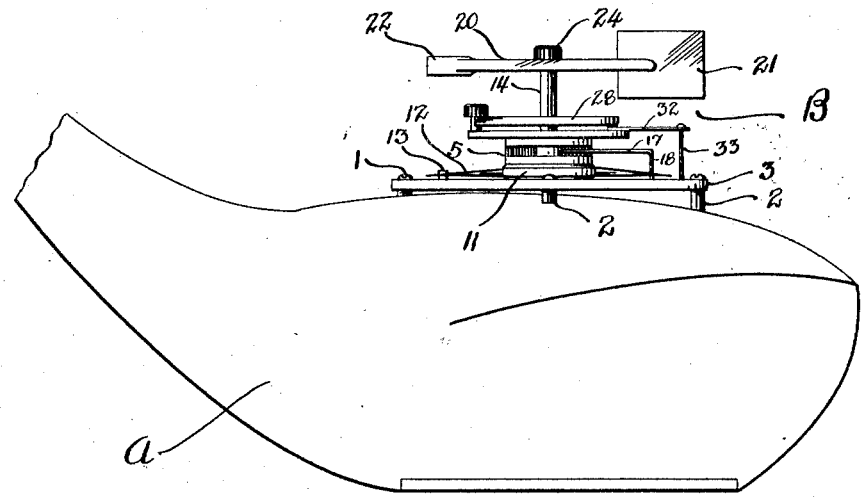
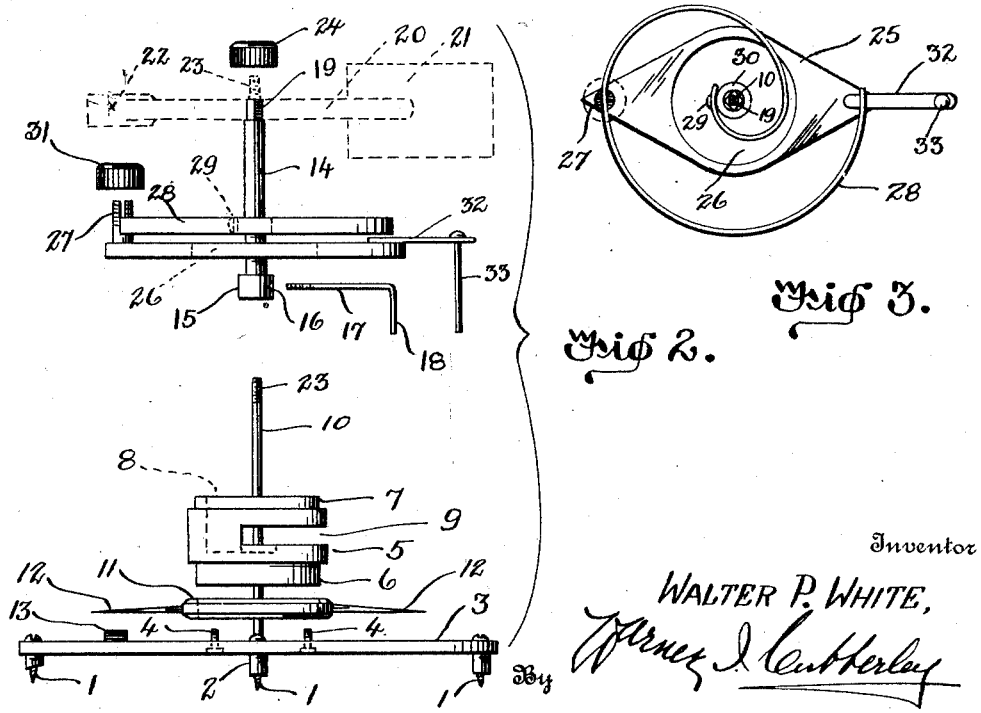
Inventor
WALTER P. WHITE,
By
Attorney Patented May 14, 1929.

1,712,537

UNITED STATES PATENT OFFICE.

WALTER P. WHITE, OF WASHINGTON, DISTRICT OF COLUMBIA.

SPEED-INDICATING DEVICE FOR GOLF CLUBS.

Application filed December 1, 1924, Serial No. 753,185. Renewed February 13, 1928.

My invention, in its broad aspect, has reference to improvements in pressure controlled, plurally adjustable instruments for measuring the maximum speed attained by a moving body having an accelerated velocity; and more particularly it is my purpose to provide an instrument of this character which may be used with a moving body having an arcuate, circular or otherwise curved path of travel, such for instance as the head of a golf club or the like, whereby the effectiveness of the free "swing" of the club may be ascertained by a student who is desirous of perfecting his drive without imposing upon himself the constraint of endeavoring to strike a ball or other mark or object.

As has been suggested, the present embodiment of my invention is especially designed for use with golf clubs, but it is to be understood that I do not by this token desire to limit my concept to any such specific application as, obviously, my instrument is capable of being used to advantage with many other moving bodies having either a constant or accelerated velocity, none of which need here be specified. In its application to golf clubs suitable means are provided whereby the instrument may be readily attached to and detached from a club head, and in order to positively maintain the actuating element of my instrument in its most effective position with respect to the controlling medium, or at approximately right angles to the path of travel of the club head, I have provided suitable means not only for initially adjusting the same to maintain constant stress, but for making adjustments precisely so that the instrument will function only upon the application of pressure between certain predetermined limits defined by the estimated power of the stroke of the manipulator of the club. Furthermore, by certain balancing devices and by the unique arrangement of the parts of my instrument I have compensated for inaccuracies in registering which would otherwise be occasioned by various mechanical accelerations and by centrifugal acceleration resulting from the movement of the club in a curved path.

To the foregoing advantages and functions of my invention may be added; first, the particular form of construction by which a high degree of cooperativeness between the respective parts is attained to the end that the instrument as a whole will function with maximum precision without utilizing extremely fragile and complicated mechanism; second, the unique formation and inter-relationship of the elements of my invention which permits of ready disassembling thereof for purposes of cleaning and replacement without utilizing special tools or the exercise of technical skill, and; third, the adaptation of the separate parts of my invention to quantity production and assembly, there being no necessity for the employment of intricate patterns, specially skilled artisans, or highly specialized machinery in its manufacture.

The particular elements of my recording instrument employed to accomplish the above and other equally important objects and advantages will be hereinafter more fully described in detail, and defined in the claims appended hereunto and forming a part of this specification.

In the accompanying drawings wherein is illustrated the preferred embodiment of my invention;—

Figure 1 is a side elevation of my instrument applied to a golf club head of conventional design, Figure 2 is an enlarged side elevation of the respective parts of my instrument in disassembled relationship, and Figure 3 is a plan view of the adjusting mechanism per se employed to attain a high degree of precision.

Like characters of reference refer to like or similar parts throughout the several views of the drawings, in which;—

A designates conventionally a golf club head upon the crown of which my indicating instrument B is mounted through the instrumentality of screws (1) operating through feet (2) carried by a base plate (3).

Detachably mounted by screws (4) upon the base plate (3), and centrally thereof, is a cylindrical block (5) the peripheral edge portions of which are annularly recessed or reduced as at (6) and (7). The block is also formed with a central cavity (8) with which a medial and transverse slot (9) communicates, and rising vertically through the block, and centrally thereof, and attached to the base plate (3), is a post or shaft (10). Adapted to be mounted for rotation upon the reduced portion (6) of the block is a collar (11), the contact between the collar and the block being sufficiently binding to afford slight frictional resistance against rotation of the collar so that the collar will remain in any given position until some positive force is applied to it, and when the block is attached to the base plate (3) the collar, of course, is positively held against detachment or displacement. Mounted upon the collar and extending diametrically opposite from each other are needles (12); the upper surface of the plate being provided with certain indicia such as graduations (not shown) for indicating the extent of movement of the needles when the collar is rotated.

A suitable stop (13) is provided on the base plate to prevent the needles from making more than one complete revolution in either direction, and the stop also functions to positively define a neutral or zero position of the needles with respect to the indicia on the base plate.

Rotationally mounted upon the post or shaft (10) is a hollow standard (14), the enlarged end (15) of which is seatable within the block substantially flush with the lower face of the transverse slot (9). The enlarged end (15) has a screw threaded opening (16) therein for receiving an arm (17) which is provided with a depending finger (18). The finger (18) is arranged to extend into the path of contemplated travel of the needles (12), so that upon rotational movement of the standard the finger will engage one of the needles to move the same to indicate the degree of movement of the standard. Return of the needle to its zero position is effected manually after each stroke. The remaining end of the standard is squared as at (19) to receive the supporting shank (20) of a vane (21). The shank (20) engages the standard at a point intermediate its length, and its remaining end is counter-balanced by a weight element (22). The post or shaft (10) extends some distance above the end of the standard (14) and is screw threaded as at (23) to receive a nut (24) which constitutes a thrust bearing for retaining the vane and standard thereon. As shown in Figure 1 of the drawing the normal position of the vane (21) is at right angles to the contemplated path of travel of the club head during a stroke, with the needles in a neutral or zero position and finger (18) contacting with one of the needles. The pressure of air upon the vane (21) will tend to rotate the same upon the axis defined by the post or shaft (10). Any movement of the vane is of course taken up by the standard (14) and in turn by the arm (17) and finger (18), thus any movement of the vane due to air pressure will be translated into corresponding movement of the needles (12). However, not only is a simple construction including the vane, standard, arm and needle ineffectual to measure speed, but any appreciable deviation of the vane from a right-angular relationship with respect to the path of travel of the club head results in air slippage and consequent lack of precision.

In order, therefore, to measure and accurately indicate the maximum speed of travel of a golf club head, I have devised plurally adjustable measuring and compensating mechanism which will now be described. An elongated plate (25) having a central opening (26) is adapted to be movably mounted in the reduced portion (7) of the block (5), and rising from one end thereof is a split, screwthreaded post (27) for receiving a spiral spring (28). One end of the spiral spring is attached as at (29) to a fixed collar or enlargement (30) on the standard (14), while the other end thereof is free; consequently by adjusting the spring within the post (27) the force (tensional) exerted by the spring relative to the plate (25) and standard (14) can be regulated. Assuming that the plate (25) is fixed, then the degree of force necessary to rotate the standard against the action of the spring can be adjusted by feeding the spring through the post (27), and this initial adjustment can be made when the instrument is assembled. However, as any considerable deviation of the vane from a right-angular relationship to the path of travel of the club head will result in air slippage and lack of precision as has heretofore been mentioned, therefore I have provided means in the form of a spring metal arm (32) on the plate (25) and carrying a detent (33) for adjusting the position of the plate by engaging the detent in serrations, notches or openings in the base plate indicative of certain adjustments (not shown). Thus the plate may be either moved against the pressure of the spring or relaxed so that the effective scope of action of the vane can be confined to relatively slight movement within limits defined by the estimated power of a stroke of a given manipulator of the golf club. Consequently, assuming that the normal power of the stroke of a given manipulator of the club is sufficient to cause the needle to move three graduations over the plate after individual adjustments have been made of my device; then obviously any improvement in the stroke will be indicated by movement of the needle over a greater number of graduations, or any weakening of the stroke will be indicated by movement over less than three graduations, or no movement at all.

While it is believed that the operation of my instrument is apparent from the foregoing, it is desired to particularly emphasize the simplicity thereof, and the peculiar relationship of the separate parts each toward the others which lends to the provision of a precise and accurate, as well as a readily assembled device particularly adapted to use under the circumstances attending practice in swinging a golf club and perfecting the stroke of the operator. Furthermore, there are no parts of intricate pattern which would be difficult to form and machine, and all parts may be quickly replaced if broken in any manner, or disassembled for cleaning.

While in the foregoing, there has been illustrated and described such combination and arrangement of elements as constitute the preferred embodiment of my invention it is nevertheless desired to emphasize the fact that interpretation of the invention should only be conclusive when made in the light of the subjoined claims.

Having described my invention and its objects with such attention to detail as will thoroughly acquaint one skilled in the art with its construction and advantages, I claim:—

1. A speed indicating device for golf clubs comprising a base, a block mounted on the base, indicating means mounted for rotation on the block and frictionally engaging the same to resist displacement from any given position, a shaft supported on the base, a standard carried by the shaft and adapted to rotate coaxially with the indicating means, a pressure responsive device carried by the standard above the block, a plate movably carried by the block, means connecting the plate with the base, inherently resilient means connecting the plate with the standard and means carried by the standard for engaging the indicating means whereby to move the same to indicate the degree of movement of the pressure responsive device.

2. A speed indicating device for golf clubs comprising a base, a block mounted on the base, a movable indicating means mounted for rotation on the block and frictionally engaging the same to resist displacement from any given position, a shaft supported on the base, a standard carried by the shaft and adapted to rotate coaxially with the indicating means, a pressure responsive device carried by the standard above the block, means for adjustably connecting the plate with the base, a plate movably carried by the block, a spring adjustably connected intermediate its ends with the plate and attached at one of its ends to the standard, and means carried by the standard for engaging the indicating means whereby to move the same to indicate the degree of movement of the pressure responsive device.

3. A speed indicating device for golf clubs comprising a base, a block mounted on the base and formed with a central opening, a collar rotatably carried by the block and frictionally engaging the same to resist movement from any given position, a shaft carried by the base and rising through the block, a rotatable element mounted on the shaft, a pressure responsive device mounted on the rotatable element, a plate movably supported on the block, means for adjustably connecting the plate with the base, an indicating device carried by the collar, a spring connecting the plate with the rotatable element, and means carried by the rotatable element and adapted for rotation coaxially with the collar for engaging the indicating device whereby to move the same to indicate the degree of movement of the pressure responsive device.

4. A speed indicating device for golf clubs comprising a base, a block mounted on the base and formed with reduced ends and a central opening, a collar rotatably carried upon one of the ends of the block and frictionally engaging the same to resist movement from any given position, a shaft carried by the base and rising through the block, a rotatable element mounted upon the shaft, a pressure responsive device mounted on the rotatable element for rotation coaxially with the collar, an elongated plate movably carried on the other end of the block, means for adjustably connecting the plate with the base, an indicating needle carried by the collar, a spring connected with the plate and with the pressure responsive device to hold said pressure responsive device in a predetermined position of rest, and an arm carried by the rotatable element for engaging the needle whereby to move the same to indicate the degree of movement of the pressure responsive device.

5. A speed indicating device for golf clubs comprising a base, a cylindrical block mounted on the base and formed with reduced ends and a central opening, a collar rotatably carried upon the lower end of the block and frictionally engaging the same to resist movement from any given position, a shaft carried by the base and rising through the block, a hollow standard movably mounted on the shaft and adapted to rotate co-axially with the collar, a pressure responsive device mounted on the standard, a plate movably carried on the upper end of the block, means connecting the plate with the base, an indicating needle carried by the collar, a spring connecting the plate with the standard, and an arm carried by the standard for engaging the needle whereby to move the same to indicate the degree of movement of the pressure responsive device.

6. In a device for indicating the speed of golf clubs, a pressure responsive device, an inherently resilient member against the force of which the pressure responsive device operates, means associated with the pressure responsive device for indicating the extent of movement thereof, and plural means independent of each other for adjusting the tension of said resilient member to control the action of the pressure responsive device, one of said means adapted to initially adjust said resilient member to hold the pressure responsive device in a position of rest until a given pressure has been reached, and the other adjusting means arranged to adapt the working pressure of said pressure responsive device to the individual needs of the operator.

7. In a speed indicating device for golf clubs, a rotatable pressure responsive device, means for indicating the extent of movement of said device, resilient means exerting its force against said pressure responsive device, and means for varying the force exerted by said resilient means on said pressure responsive device to hold it in a state of rest so as to vary the pressure required to move it from a state of rest.

8. A speed indicating device for golf clubs comprising a base, a movable indicating device, means for mounting the indicating device on the base, a pressure responsive device, means for supporting the pressure responsive device on the base, an inherently resilient member, means for adjustably connecting the resilient member with the means for mounting the indicating device, means for connecting said resilient member to the pressure responsive device, and means connecting the pressure responsive device with the indicating means for the purpose defined.

9. In a speed indicating device for golf clubs, a movable pressure responsive device, an indicator affected by said device, a spring for controlling the pressure responsive device, and means for adjusting the spring so as to bring close to the point of rest the extreme position of the pressure responsive device when in action in order that the effective motion of the pressure responsive device may be accomplished in a relatively brief period of time.

In testimony whereof I affix my signature hereunto.

WALTER P. WHITE.